Sept. 28, 1965   W. E. N. DOTY ETAL   3,208,545
APPARATUS FOR CONTROLLING A SEISMIC VIBRATOR
Filed Aug. 31, 1959   2 Sheets-Sheet 1

INVENTOR.
WILLIAM E. N. DOTY
JIMMY R. COLE
MILFORD R. LEE
BY L. David Chapnell
ATTORNEY Sept. 28, 1965   W. E. N. DOTY ETAL   3,208,545
APPARATUS FOR CONTROLLING A SEISMIC VIBRATOR
Filed Aug. 31, 1959   2 Sheets-Sheet 2

INVENTOR.
WILLIAM E.N. DOTY
JIMMY R. COLE
MILFORD R. LEE

BY L. David Trapnell
ATTORNEY 3,208,545
APPARATUS FOR CONTROLLING A
SEISMIC VIBRATOR
William E. N. Doty, Jimmy R. Cole, and Milford R. Lee, Ponca City, Okla., assignors to Continental Oil Company, Ponca City, Okla., a corporation of Delaware
Filed Aug. 31, 1959, Ser. No. 837,108
3 Claims. (Cl. 181—.5)

This invention relates to a system for minimizing the phase variations occurring between a reference signal used to control a seismic vibrator and the elastic signal transmitted by the vibrator when it is coupled to different propagating media. This phase control is important when it is desired to generate identical signals sequentially at several locations where the properties of the propagating medium differ materially.

Although useful in various fields, this invention is particularly useful in the field of seismic prospecting when use is made of a continuous energy source, such as a seismic vibrator. This type of energy source has great inherent advantages over the conventional explosive type because it is more mobile, more economical, and obviously safer. However, in view of the comparatively weak energy output and the difficulties associated with a surface transmission, it is generally necessary to use a pattern of source locations from which identical signals are transmitted. Also, the physical characteristics of the surface material vary widely from point to point and, consequently, there is need for a scheme which allows for an automatic compensation of the control of the vibrator for these variations from one source location to another in order that the vibrator repeatedly and sequentially generates the same elastic signal independently of the characteristics of the propagating medium to which it is coupled.

This invention is also very useful when the vibrators constituting the source pattern are operated simultaneously to increase the vertical directivity of the transmission since, in this case, it is important that all the elastic signals generated by the vibrators be identical and synchronized in order to engender a flat wave front.

Broadly stated, this invention relates to an apparatus for minimizing the phase variations between a reference signal and the signal which is transmitted by a seismic vibrator controlled by the reference signal when the vibrator is coupled to different propagating media.

An object of the invention is to provide a system for controlling the phase of an elastic signal transmitted by a seismic vibrator controlled by a reference signal.

Another object of the invention is to provide a system for synchronizing a plurality of vibrators controlled by a reference signal.

A further object of the invention is to provide a system for minimizing the phase variations between the elastic signal transmitted by a vibrator controlled by a reference signal when the vibrator is sequentially coupled to different propagating media, such that a single reference signal may be used as a common control for the various sequential transmissions and also serve as a common counterpart for all the sequentially transmitted signals in a correlation prospecting system of the type disclosed in U.S. Patent 2,688,124. It is clear that, in this way, a great saving in recording space is attained, since a single channel is required to preserve the common counterpart signal which also serves as a reference signal.

An additional object of this invention is to provide a system for minimizing the phase shift of the elastic signal transmitted by a seismic vibrator controlled by a reference signal when it is coupled sequentially to different propagating media, such that the signals recorded as a result of these sequential transmissions may be directly composited for elimination of undesirable components ahead of other computing operations, such as correlation, since the signals transmitted sequentially by the vibrator have a fixed phase relationship with respect to the reference signal.

Other objects and advantages of the invention will be evident from the following detailed description, when read in conjunction with the accompanying drawings which illustrate the invention.

Figure 1:
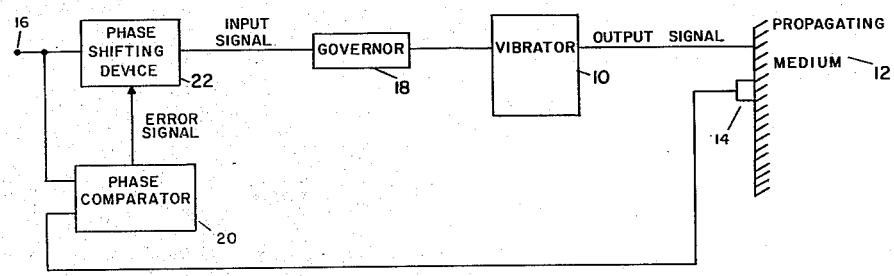
FIGURE 1 is a diagrammatic representation of a vibrator system constructed according to the basic teaching of this invention.

Referring now to FIGURE 1, a seismic vibrator 10 generates an elastic signal which is applied to a propagating medium 12. Various well known types of vibrators may be used for this purpose, such as eccentric mechanical, hydraulic, or electromagnetic shakers capable of imparting seismic vibrations to a supporting medium. These vibrations are detected by a sampling detector, such as a seismometer 14, which produces a first signal representative of the signal transmitted by the vibrator. The purpose of the invention is to control, accurately and automatically, the phase existing between this transmitted signal and a reference signal available at a terminal 16 and usable to control the governor 18 of the seismic vibrator 10.

It is clear that if the reference signal were used directly to control the operation of the vibrator 10, the signal transmitted to the propagating medium 12 would have a phase lag with respect to the reference signal which would be variable with the frequency of the reference signal and with the elastic characteristics of the propagating medium. Therefore, the invention has a double purpose. It maintains a constant phase (which may be selected to be zero) when the frequency of the reference signal is varying and, in addition, it preserves this constant phase when the vibrator is applied to different propagating media having dissimilar elastic characteristics.

In order to perform this double task, the reference signal and the signal produced by the seismometer 14 are applied to the input of phase comparator 20 which produces a second signal indicative of the phase relation between the transmitted signal and the reference signal. This second signal may be considered to be an error signal and is used to control a phase shifting device 22 which in turn applies to the reference signal the amount of phase shift necessary to compensate for the phase lag existing between the reference signal and the transmitted signal. The phase-shifted refence signal is then used to control the operation of the seismic vibrator 10 so that the phase lag introduced by the coupling of the vibrator to the propagating medium 12 brings the transmitted and reference signals in phase coincidence.

Following this simplified outline of the basic principles underlying the invention, a detailed description of a preferred embodiment will be given in connection with FIGURE 2. This description will only relate to the operation of the phase comparator 20 and phase shifting device 22, since the other elements indicated in FIGURE 1 are well known to persons skilled in this art and merely play an incidental role in this invention.

Figure 2:
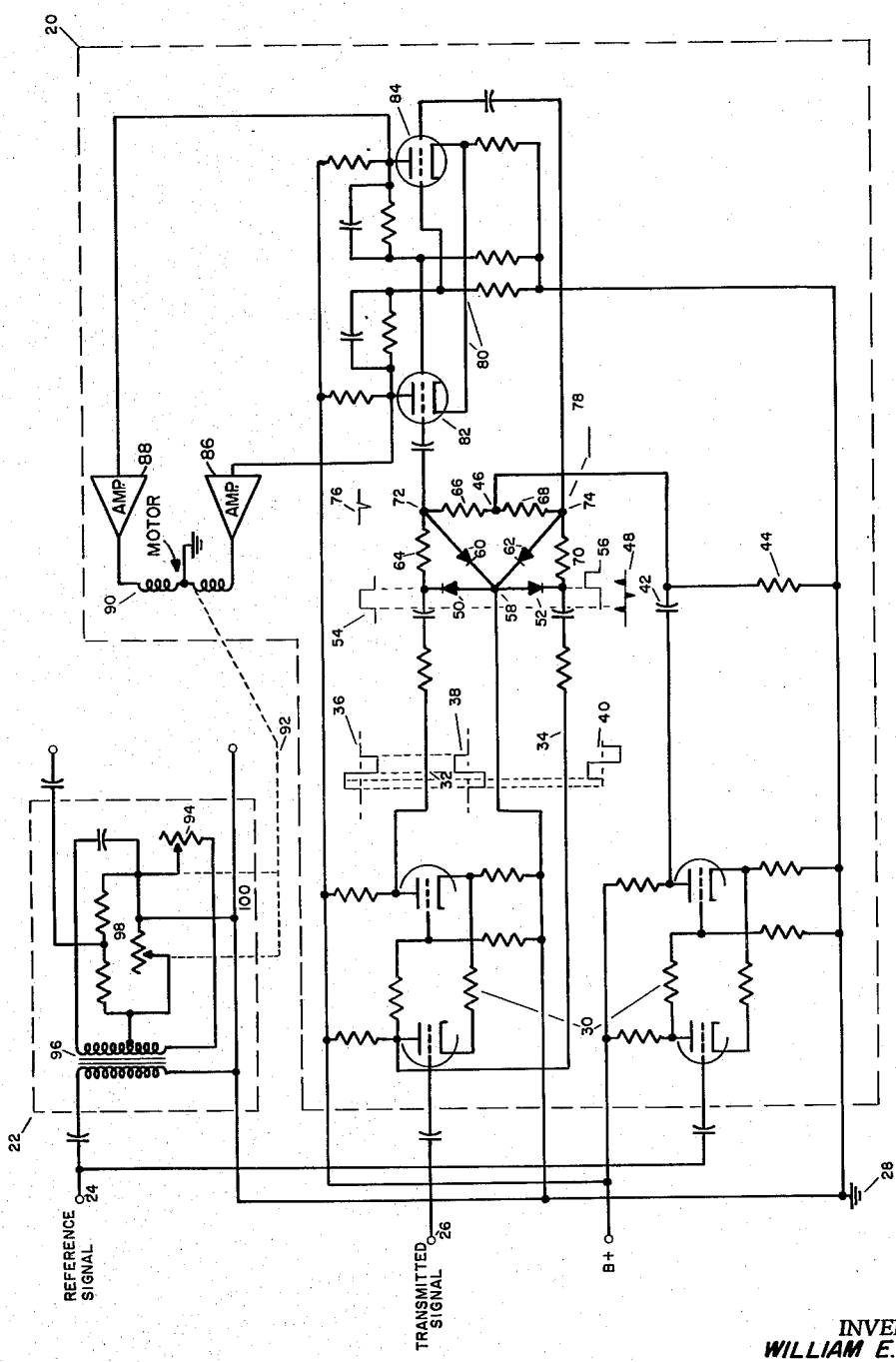
FIGURE 2 is a circuit diagram indicating in detail the various elements of a preferred embodiment of the invention.

Referring then to FIGURE 2, it may be seen that the correspondence between this circuit diagram and the block diagram of FIGURE 1 has been indicated by outlining, with dashed lines, the groups of components constituting the phase comparator 20 and the phase shifting device 22.

Considering now more particularly the circuits associated with the phase comparator 20, it is seen that the two signals whose phases are to be compared are shown available at terminals 24 and 26 for the reference signal and for the transmittal signal, respectively, as voltages referred to a common ground 28. These signals are generally continuously varying signals of changing frequencies, and the determination of their phase relationship requires the selection of a reference point. In the preferred embodiment, the reference point selected is the zero crossing since, in this fashion, the phase determination is independent of amplitudes.

The two signals are applied to two identical clipper and Schmitt trigger circuits, generally designated by reference character 30, which operate as squaring circuits for the input waves. Consequently, the respective outputs of these circuits are square waves which have retained the times of occurrence of the zero crossing of their respective input waves, but are independent of their shape and amplitude. Such circuits are well known in the electronic art and a good description accompanied by a clear explanation of their operation is available, starting at page 165 of the book "Pulse and Digital Circuits," by J. Millman and H. Taub, published in 1956 by the McGraw-Hill Book Company. It must be noticed that the Schmitt circuit 30 operating on the transmitted signal available at 26 is also used to provide two channels 32 and 34 carrying two synchronous square waves 36 and 38 having opposite phase as they appear at each of the two plates of this cathode-coupled binary circuit. The square wave 36 carried by channel 32 is representative of the phase of the input signal from terminal 26, while the square wave 38 carried by channel 34 is inverse of wave 36. The square wave corresponding to the reference signal is indicated at 40. The lead or lag of square wave 40 with respect to the synchronous square waves 36 and 38 is therefore indicative of the phase relation between the transmitted signal and the reference signal.

The square wave 40 is differentiated by the combination of capacitor 42 and resistor 44 whose values are selected so that the time constant of this RC circuit is very small in comparison to the period of the original signals. As a result, the signal applied at point 46 contains impulses of alternate polarity synchronized with the zero crossings of the reference signal. This signal is represented by the wave shape indicated at 48. The negative portions of square wave 36 are eliminated by the diode 50, which bypasses them to ground. Similarly, the negative portions of square wave 38 are eliminated by the diode 52.

Figure 3:
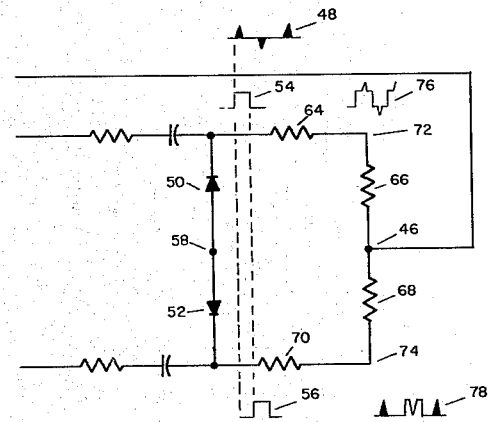
FIGURE 3 is a partial circuit diagram which is useful in explaining the operation of a phase detector used in connection with this invention.
Figure 4:
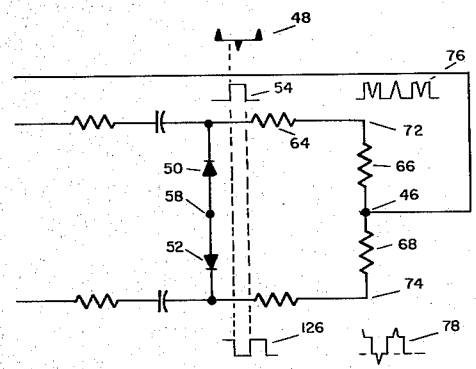
FIGURE 4 is another partial circuit diagram which is also useful in explaining the operation of a phase detector used in connection with the invention.

The respective resulting signals, 54 and 56, are therefore positive square waves appearing alternately on each side of the grounded center point 58. The three signals indicated by 48, 54, and 56 may be used to produce an impulse appearing on one or the other of channels 32 and 34, depending on the lag or lead of the reference signal with respect to the transmitted signal. This may be better explained in connection with FIGURES 3 and 4, which correspond respectively to the cases of lag and lead. It must be noted that corresponding elements of FIGURES 2, 3, and 4 have been designated by a common reference character so that the interrelation between these figures is more clearly apparent. In addition, for purposes of clarity, two diodes 60 and 62 present in the circuit of FIGURE 2 have been deleted in FIGURES 3 and 4 because it is easier to understand first the operation of the circuit in the absence of these diodes.

The signal 48 representative of the relative phase of the reference signal is added to each of the signals 54 and 56 by means of a bridge combination of resistors 64, 66, 68, and 70. The resulting signals appearing at points 72 and 74 are indicated at 76 and 78. It should be noticed, by comparing these signals of FIGURES 3 and 4, that if the resistors have been so chosen that the impulses contributed by signal 48 and the square waves contributed by the signals 54 or 56 have equal amplitudes, the output signals 76 and 78 are made up entirely of positive excursions to the exclusion of a negative impulse appearing on signal 76 in the case of FIGURE 3, and on signal 78 in the case of FIGURE 4. Consequently, returning to FIGURE 2 and analyzing what occurs when the two diodes 60 and 62 are inserted in the circuit, it is seen that, the positive portions of the signals being bypassed to ground by the diodes, there appears a negative pulse at 72 or 74, depending upon relative lag or lead of the reference signal with respect to the transmitted signal.

Therefore, the circuit constitutes a phase detector which operates so that negative pulses appear at the output of one or the other of the channels, 32 or 34, depending on the relative phase existing between the reference and transmitted signals. However, it should be noted that this circuit does not indicate the amount of lead or lag but merely discriminates between the two. Thus, it may be used as part of a servosystem of the relay type in contradistinction to the proportional servosystems The negative pulse 76 or 78 may be used to trigger a bistable multivibrator generally designated by reference character 80, which will remain in one stable conducting state as long as the negative pulse appears on the same channel, but will transfer to its other stable conducting state as soon as the negative pulse appears on the other channel. It is not believed necessary to describe the multivibrator circuit 80 in detail, since it is very well known in the art and it suffices to say that it comprises two tubes 82 and 84 and that, in one state, tube 82 is cut off and 84 is in clamp, while, in the other state, the situation is reversed. Consequently, there are D.C. voltages developed on the plates of the tubes of the multivibrator which change as it goes from one state to the other and which voltages may be used to drive two power amplifiers 86 and 88 which energize the split armature 90 of a D.C. motor. As a result, it is clear that the motor will rotate steadily in one direction as long as a lead or lag condition is sensed by the phase detector, but will reverse its rotation when this condition changes from lead to lag, or vice versa. The shaft of this motor is indicated diagrammatically by line 92 and is connected to a double potentiometer 94 belonging to the phase shifting device 22.

Th phase shift device 22 is well known in the art, therefore only a resume will be sufficient to describe it and explain its function. The reference signal is applied to the primary of a transformer 96 having a center-tapped secondary. A first standard 180 degree phase shift circuit is used in combination with another resistance bridge 180 degree phase shift circuit so that a total phase shift of 360 degrees may be operated by this circuit. The output signal, which is the phase shifted reference signal, appears between the two opposite junctions 98 and 100 of the bridge. It is therefore available for control of the seismic vibrator governor 18 through well-known amplifying means. More detailed information concerning the 180 degree phase shift circuit is available on page 225 of the book "Industrial Electronics and Control," by R. G. Kloeffler, published by J. Wiley and Sons, Inc., in 1949.

From the foregoing it will be apparent that the present invention provides a novel apparatus for minimizing the phase variations between the elastic signal transmitted by one or more vibrators controlled by a reference signal when one vibrator is sequentially coupled to different propagating media, or when a plurality of vibrators are coupled to different propagating media and simultaneously operated, such that a single reference signal may be used as a common control for all the transmissions and will serve as a common counterpart for all the transmitted signals in a correlation type of prospecting operation. It will further be apparent that the present invention provides such a method and system wherein the signals recorded as a result of the various transmissions may be directly composited for elimination of undesirable components ahead of other computing operations, since the signals transmitted sequentially by one vibrator, or the signals simultaneously transmitted by a plurality of vibrators, have a fixed phase relationship with respect to the reference signal.

Changes may be made in the combination and arrangement of parts or elements, as well as steps and procedures, as disclosed herein, without departing from the scope and spirit of the invention as defined in the following claims:

We claim:

1. A system for minimizing the phase variations between a signal as received and said signal as subsequentially transmitted comprising: a first signal, a transmitting means, phase shifting means connecting said first signal to said transmitting means, signal pickup means adapted to develop a second signal which corresponds to the signal transmitted by said transmitting means, phase comparing means connected to receive both said first and second signals and to develop a third signal characteristic of the phase difference between said first and second signals, means receiving said third signal and developing an output which is applied to said phase shifting means whereby the phase of said second signal is varied to correspond to the phase of said first signal.

2. A system for minimizing the phase variations between a reference signal and a signal transmitted by a seismic vibrator which is controlled by the reference signal comprising: an input means having said reference signal applied thereto; a phase shifting means connected between said input means and said seismic vibrator; means for producing a first signal substantially identical to the signal transmitted by said vibrator; phase comparison means having first and second inputs and an output, said first input connected to said input means, said second input connected to said first signal producing means; means connecting the output of said phase comparison means to said phase shifting means whereby variations in phase between said reference signal and the signal transmitted from said vibrator are compared by said phase comparison means and the error signal thus developed operating on said phase shifting means such that the phase from the vibrator is continuously brought into agreement with the phase of the reference signal.

3. A system for minimizing the phase variations between a reference signal and the signal which is transmitted by a seismic vibrator controlled by the reference signal when the vibrator is coupled to different propagating media, comprising:

a. a reference signal;
b. phase shifting means for coupling said reference signal input to the input of said seismic vibrator;
c. means for producing a first signal substantially identical to the signal transmitted by the vibrator;
d. phase comparison means having its inputs connected to said reference signal input and to said first signal producing means, means for producing at its output one of two signals corresponding to, respectively, a lead or lag condition of said reference signal with respect to said first signal; and
e. means connecting the output of said phase comparison means to said phase shifting means for shifting the signal applied to said seismic vibrators in accordance with said one of the two signals.

References Cited by the Examiner

UNITED STATES PATENTS

| | | | |
|---|---|---|---|
| 2,355,826 | 8/44 | Sharpe | 340—15.5 |
| 2,470,099 | 5/49 | Hall | 91—363 X |
| 2,564,682 | 8/51 | Fisk | 323—101 |
| 2,622,236 | 12/52 | White | 328—155 |
| 2,817,701 | 12/57 | Johnson | 340—174 |
| 2,828,478 | 3/58 | Johnson | 340—174 |
| 2,853,667 | 9/58 | Booth et al. | 73—71.6 X |
| 2,906,866 | 9/59 | Thompson | 250—6 |
| 2,924,783 | 2/60 | Shapiro et al. | 331—4 |
| 2,955,460 | 10/60 | Stevens et al. | 91—275 |
| 3,038,451 | 6/62 | Sporn et al. | 91—361 X |
| 3,073,406 | 1/63 | Westphal | 340—18 X |

BENJAMIN A. BORCHELT, *Primary Examiner.*

CHESTER L. JUSTUS, KATHLEEN H. CLAFFY, LAWRENCE V. EFNER, EDWIN R. REYNOLDS, IRVING L. SRAGOW, *Examiners.*